United States Patent

[11] 3,563,247

| | | | |
|---|---|---|---|
| [72] | Inventor | David L. Bowers<br>Wauwatosa, Wis. | |
| [21] | Appl. No. | 713,110 | |
| [22] | Filed | Mar. 14, 1968 | |
| [45] | Patented | Feb. 16, 1971 | |
| [73] | Assignee | General Electric Company<br>a corporation of New York | |

[54] BIDIRECTIONAL HEART STIMULATOR
2 Claims, 5 Drawing Figs.

[52] U.S. Cl. ................................................. 128/422
[51] Int. Cl. ............................................... A61h 31/00
[50] Field of Search .......................................... 128/419,
421, 422, 423, 419P(Digest)

[56] References Cited
OTHER REFERENCES

Cobbold et al, " Medical Electronics & Biological Engineering", Vol. 3, No. 3, July, 1965, pp. 273-277, (copy in 128-419P)

*Primary Examiner*—William E. Kamm
*Attorneys*—Ralph G. Hohenfeldt, Frank L. Neuhauser, Oscar B. Waddell and Melvin M. Goldenberg

ABSTRACT: An implantable electronic heart stimulator has a coupling capacitor in series with the subject's heart to which it is electrically connected. Electronic switches sequentially apply a pulse of one polarity for stimulating the heart by charging the capacitor and apply a second stimulating pulse of opposite polarity by discharging the capacitor. An electronic timer controls the electronic switches. Means are provided for increasing the pulse repetition rate externally of the subject.

PATENTED FEB 16 1971
3,563,247
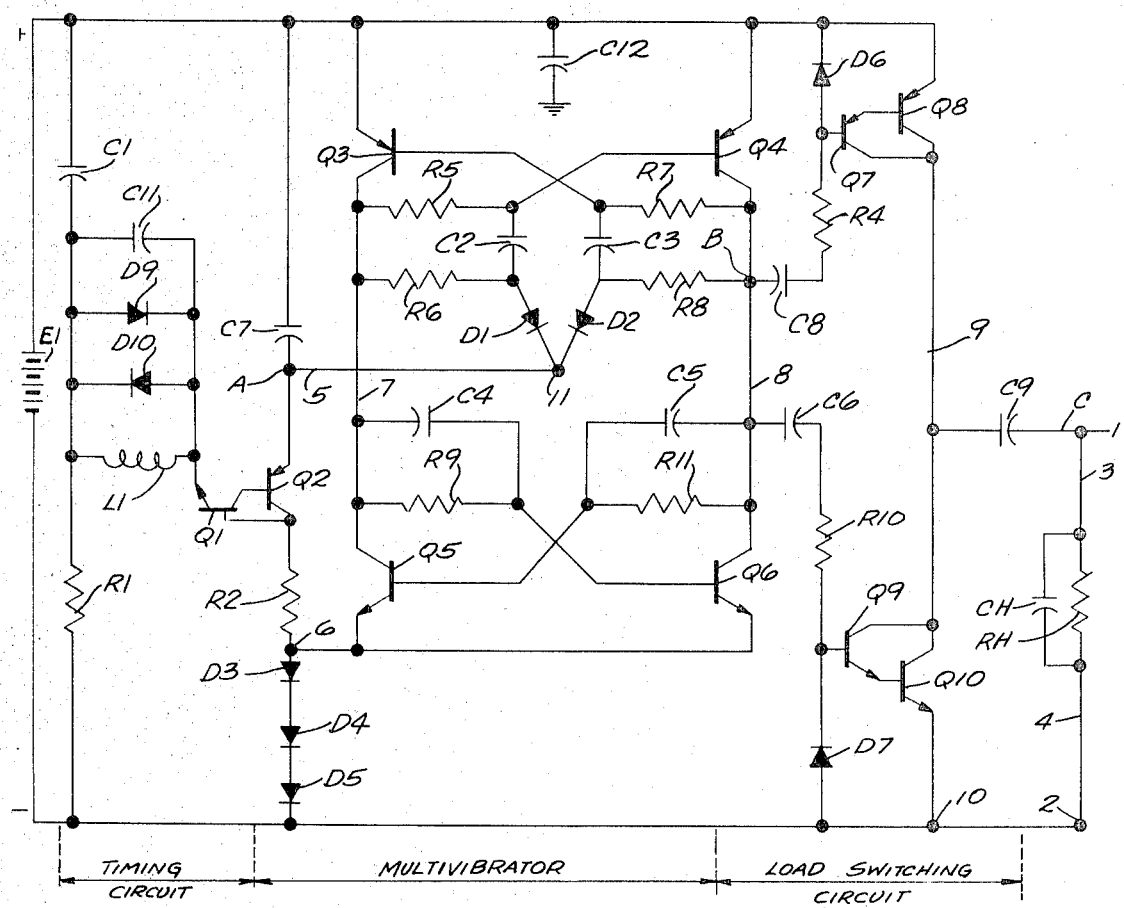
Fig. 1
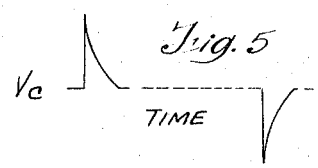
Inventor
David L. Bowers
By Ralph D. Hohenfeldt
Attorney 3,563,247

BIDIRECTIONAL HEART STIMULATOR

BACKGROUND OF THE INVENTION

Self-contained battery-powered electronic heart stimulators are surgically implanted in subjects who require artificial electrical stimulation to maintain regular ventricular contractions at an elevated rate. Most known types of self-contained stimulators couple a pulse generator to the heart by means of a capacitor. The pulse generator is adapted to discharge the capacitor in a short time interval so that the accompanying current flow and pulse energy are high enough to effect stimulation. Between beats, and hence between stimuli, the capacitor charges through the heart in the opposite direction and over a comparatively long interval during which current flow and energy dissipated are insufficient to effect stimulation. The physiological effects of this unbalanced pulse energy on the heart have not been fully elucidated. There is evidence, however, that the energy unbalance causes permeation of heart tissue by metal ions that depart from the metal electrode wires which attach to the heart and of corrosion on the wires after an implant of long duration.

SUMMARY OF THE INVENTION

As a result of the present invention, both ion permeation and corrosion can be reduced significantly and other benefits may also be obtained. Another main advantage is the increase in circuit efficiency obtainable with the bidirectional circuit over the unidirectional design presently being used for heart stimulation. Theoretically, circuit efficiency should double because the coupling capacitor charges only every other pulse instead of every stimulus pulse as in the unidirectional design. According to the invention, an electronic timer is incorporated in the stimulator to establish the basic repetition rate of the stimulating pulses. The timer controls two sets of electronic switches. One switch is turned on to charge a coupling capacitor directly from the battery and to apply a stimulating pulse to the heart over a short interval after which the switch is turned off. It should be noted that the source impedance of the battery must be small compared with the load impedance to produce adequate stimulation. During the interpulse period, the capacitor remains substantially fully charged but no stimulation occurs. The second electronic switch is then turned on and the capacitor is caused to discharge during a short interval in which case an opposite polarity stimulating pulse is applied to the heart. The alternating pulse series is continuous so that the energy dissipated in the heart is balanced. Thus, the metal ions cannot migrate a very great distance from the electrodes at which they originate between pulses and they are attracted back when polarity changes. This is believed to be the phenomena involved in the low ionic migration and corrosion reduction that are achieved with the invention.

The new stimulator is also distinguished by using diodes to develop a biasing voltage for the transistors in the timer. This not only results in a stimulator of smaller size by eliminating previously used bias batteries, but it also improves reliability in a body implanted device where compactness, reliability and greater time between battery replacements are of paramount importance.

It is evident that a primary object of this invention is to provide an artificial electronic heart stimulator which produces stimulating pulses that are alternately positive and negative and of equal energy for effective stimulation.

A further object is to obtain higher efficiency and, therefore, extended battery life from an implantable stimulator by using current that flows in both directions through the heart to effectively stimulate the heart in which case circuit efficiency may exceed 50 percent as compared with the theoretical maximum efficiency of 50 percent in prior devices.

Other objects are to minimize electrode corrosion and metal ion permeation of the heart tissue.

How the foregoing and other more specific objects are achieved will appear from time-to-time throughout the course of the ensuing description of a preferred embodiment of the invention which makes reference to the drawing.

DESCRIPTION OF THE DRAWING

FIG. 1 is a circuit diagram of the new heart stimulator; and
FIG. 2—5 are voltage wave forms, occurring at various points in the circuit, which are presented to facilitate describing the invention.

DESCRIPTION OF THE PREFERRED EMBODIMENT

In FIG. 1, the simplified electric parameters of the heart are represented by a resistor RH and a capacitor CH. The resistance value of the heart is usually around 300 ohms, but the present stimulator is intended to operate over a load range of 50 to 1,000 ohms. The capacitance of the heart is nonlinear and may be simulated with a 0.1 microfarad capacitor.

The output terminals of the stimulator are marked 1 and 2. The heart load is connected across the output terminals by means of insulated flexible metallic leads 3 and 4 which are sutured into the heart and make a metal-to-tissue connection. Conduction of electric pulses of the proper energy level through the tissue produces ventricular contraction corresponding to the pulse rate.

All of the components to the left of output terminals 1 and 2 in the drawing are ordinarily encapsulated in an epoxy material and covered with an inert silicone rubber coating to prevent exposure to body tissue and fluids. Heart coupling capacitor C9, for instance, is included in the encapsulation and serves the purpose of coupling the pulses from the stimulator to the heart and also provides biphasic stimulation. Net current transfer is zero. The encapsulated device may be implanted at a site remote from the heart such as in the midaxillary region or in the abdominal section. From there it is connected to the heart by means of electrode leads 3 and 4 which make a self-sealing, detachable connection, not shown, with output terminals 1 and 2 of the stimulator.

The construction and operating mode of the new stimulator will now be described. Power is supplied by a battery E1 made up of several mercury cells which, in this case, total eight volts. An isotope thermal voltaic cell with low source impedance, not shown, could be substituted for the battery.

For convenience of explanation, the stimulator is shown as being divided into three sections, a timing circuit, a bistable multivibrator, and a load switching circuit. In reality, the timing circuit and multivibrator establishes the switching logic for the load switching circuit. The reason for operating the multivibrator as a bistable device and being triggered by a timing circuit is to insure the pace pulse interval between the positive to negative pulses as well as the negative to positive pulses remain the same and equal.

Assume that the multivibrator begins conduction through one path or another as soon as battery power is supplied. In one bistable state, transistors Q4 and Q5 conduct together and in the other bistable state, transistors Q3 and Q6 conduct. The multivibrator is triggered by a pulse generator and the timing circuit, which will be described later, by a trigger pulse on conductor 5. The trigger input terminal of the multivibrator is marked 11. As a result of the multivibrator conducting at all times, there is a bias voltage drop developed at point 6 across diodes D3 to D5. The purpose of the bias voltage will be stated below.

Initially, transistors Q1 and Q2 in the pulse generator and timing circuit are nonconductive. When power is applied, timing capacitor C1 begins to charge from positive line through timing resistor R1 to negative line. At the beginning of the charging cycle, when current flow is heavy, most of the voltage drop occurs across R1, and there is no forward bias voltage on the base and emitter circuits of Q1 and Q2. The voltage drop across R1 is in the opposite sense to the bias voltage at point 6. The voltage across R1 is less than the bias voltage minus the required breakdown voltage of the base-to-emitter circuit of Q1. Thus, capacitor C1 must charge to a predetermined voltage before Q1 will become conductive. When the base-to-emitter path of Q1 is forward biased, a current pulse flows through capacitor C7, the emitter and base of Q2, the collector and emitter of Q1, shunting diode D10 and to the negative side of capacitor C1. This causes transistor Q2 to conduct a negative-going pulse which appears at point A on the emitter of transistor Q2. Upon occurrence of each negative pulse, capacitor C1 discharges through a path which will be described later and begins timing for the next pulse. The repetition rate of the negative pulses at point A corresponds with the desired basic pacing rate of the heart for which 70 pulses per minute may be taken as a typical pulse rate. The uninterrupted series of negative pulses occurring at point A are represented in FIG. 2.

The negative pulses at point A are transmitted by way of conductor 5 to a trigger pulse input terminal point 11 of a pair of steering diodes D1 and D2. Application of the triggering pulses causes the multivibrator to switch from one stable state to another.

Assume that before application of the first negative pulse to point 11, that transistors Q4 and Q5 are conducting and Q4 is in saturation. This makes point B, the multivibrator output terminal, relatively positive as compared with the potential at that point when Q4 is not conducting. The repetitive potential changes occurring at point B are shown in FIG. 3. With Q4 and Q5 conducting, current flows through two paths. One path is through the emitter and base of Q4, resistor R5, conductor 7, and the collector-to-emitter path Q5. The other path is from the emitter-to-collector of Q4, line 8, R11 and the base-to-emitter of Q5.

Under the conditions described above, when the first negative pulse under consideration is applied to point 11, diode D2 becomes forward biased and the previously discharged capacitor C3 charges through the emitter and base of Q3. The negative pulse cannot be conducted through diode D1 because it is reversed biased when Q4 and Q3 are conductive. It is when diode D2 conducts that timing capacitor C1 is discharged by way of the positive line, Q4, R8, D2, line 5, Q2, Q1 and D10. Recharging of timing capacitor C1 then begins again through R1 to negative line.

The pulse through capacitor C3 makes the base of Q3 negative and forward biases the emitter and base junction making it conductive. With Q3 forward biased, its collector becomes more positive so that the base and emitter of Q6 are also forward biased through resistor R9, shunted by commutation capacitor C4 and Q3. Transistors Q3 and Q6 are now conductive and Q4 and Q5 are turned off. The bias voltage of Q4 was momentarily removed when Q3 conducted causing Q4 to stop conducting. This also reduced to zero the forward bias current Q5 through R11 in which case commutating capacitor C5 will discharge through R11 and applies additional reverse bias to the emitter and base of Q5, aiding its cutoff. This switching event causes point B to go from its high positive potential level to a potential near the negative line except as limited by the voltage drop across the diodes D3—D5 and transistor Q6. When the next negative pulse is applied to point 11, diode D1 will be forward biased and the multivibrator will return to its original state by the converse of the process described above. Thus, it is seen that each negative pulse occurring at point A as shown in FIG. 2 causes point B to swing alternately between positive and more negative potentials as shown in FIG. 3.

When the multivibrator is in the state where Q6 is conducting, point B is relatively more negative as stated above because it is effectively approaching negative line potential. Under this condition, the emitter-to-base circuits of some semiconductor switching devices such as transistors Q7 and Q8 are forward-biased and capacitor C8 charges from positive line through transistors Q7 and Q8 and resistor R4. This, of course, causes the emitter-to-collector paths of cascaded transistors Q7 and Q8 to become highly conductive and to charge the coupling capacitor C9 in which case a current pulse is delivered through the heart load RH and CH to the negative line. The current pulse causes ventricular contraction and its effective stimulating time is about 2 milliseconds. The energy of the pulse is preferably about 70 microjoules. After the pulse just described, the left side of capacitor C9 remains positively charged during an interpulse period when no electrical effect is exerted on the heart. It should be noted that capacitor C9 may be relocated in the line between point 10 and terminal 2 without changing operation of the circuit.

When point B begins going positive again, capacitor C8 discharges through resistor R4, diode D6 and transistor Q4. While capacitor C8 is discharging, another capacitor C6 begins charging when point B goes positive. The charging path is from positive line, through Q4 to point B and through capacitor C6, resistor R10 and the base and emitter paths of cascaded switching transistors Q9 and Q10 to negative line. This forward-biases transistors Q9 and Q10 and turns them on so that the energy stored in coupling capacitor C9 may be discharged through these transistors and cause an oppositely directed current pulse to flow through the heart by virtue of a voltage which is positive at terminal 2 and negative at terminal 1. Thus, it is seen that the energy consumed from battery E1 for charging capacitor C9 and applying a pulse of one polarity to the heart is used again minus losses when capacitor C9 is discharged to apply a current pulse of opposite polarity to the heart. Hence, a theoretical maximum efficiency of 50 percent and an actual efficiency of about 30 to 35 percent which pertains to prior stimulators has been removed and actual efficiencies of 60 or 70 percent are obtained with the invention. The alternate positive and negative pulses applied to the heart are illustrated in FIG. 4 where they are on the same time basis as the other pulses. An expanded view of one pair of stimulating pulses from FIG. 4 are shown in FIG. 5.

The stimulator described above is adapted to operate with a known type of external rate control, not shown. The rate control comprises a pulse generator that is adjustable to higher pulse rates than the basic set pulse rate of the stimulator so that the heart can be accelerated at the option of the patient. The external pulse generator supplies an induction coil which is placed over the stimulator to effect magnetic coupling with an induction coil L1 in the stimulator as shown. Voltage induced in coil L1 is applied across capacitor C11 and diodes D9 and D10 and causes transistor Q1 to become conductive prior to the time it would normally become conductive as a result of awaiting charging of capacitor C1 to a certain level. The remainder of the circuit functions in the way described above except that output pulses at the desired higher rate occur at stimulator terminals 1 and 2.

Shunted across the terminals of inductor L1 are a pair of diodes D9 and D10 which act as clippers to the induced pulses and thus fix the input of Q1 at a definite level. The shunting capacitor C11 helps to bypass any high frequency interference signals that may interfere with stimulator operation. Common types of interference to which the stimulator may be exposed comes from appliances such as electric razors, hand drills and the like.

The stimulator also includes a filter capacitor C12 which may be fairly small because current drain during load pulsing is low and the internal impedance of the battery E1 is moderate. If a high internal impedance isotope thermal voltaic cell, not shown, were substituted for the battery, a larger filter capacitor would be required to reduce source impedance.

Those versed in the electronic art will understand that the stimulator circuitry described above may be converted readily to the use of semiconductors of opposite conductivity from those shown, provided proper polarities are observed. In this case, the stimulator will still apply alternate polarity pulses to the heart.

In summary, a new type of heart stimulator has been described which is characterized by charging a coupling capacitor through a momentarily conductive switch to stimulate the heart with a current pulse in one direction and then discharging the capacitor through another momentarily conductive switch to stimulate the heart with a current pulse in the opposite direction. The stimulator is truly biphasic. Its total current consumption is about 22 microamperes as compared with 35 to 40 microamperes for some current stimulator designs. Its efficiency exceeds 50 percent which is the theoretical limit for prior types of unidirectional stimulators.

I claim:

1. An electric heart stimulator comprising:
   a. a series circuit including a coupling capacitor and a pair of terminals that are adapted for being connected to a heart which is to be stimulated;
   b. a DC power source having opposite polarity terminals;
   c. first and second semiconductor switch means connected serially with each other across the terminals of the power source, and each of said switch means being adapted to conduct current in opposite direction, respectively;
   d. the said series circuit having one of its ends connected at a point intermediate the semiconductor switches and its other end connected to one terminal of the power source;
   e. a bistable multivibrator having an output terminal on which alternate potential changes occur repetitively at a rate that corresponds with the stimulation rate of the heart, said semiconductor switches being connected to said output terminal and each of said switches being rendered alternately conductive in response to the alternately occurring potential changes on said output terminal;
   f. whereby one of the semiconductor switches may conduct to charge said coupling capacitor from the source and impart current in one direction through the heart to stimulate a heartbeat and then the other semiconductor switch may conduct to discharge the coupling capacitor and impart current in the opposite direction through the heart to stimulate the next consecutive heartbeat;
   g. a generator of single polarity pulses which occur at a constant repetition rate corresponding with the desired heart stimulation rate, said generator having an output terminal on which the pulses occur; and
   h. said bistable multivibrator having an input trigger terminal receiving pulses from said pulse generator output terminal and responding to each such pulse by producing alternate potential changes on the multivibrator output terminal as aforesaid.

2. The invention set forth in claim 1 wherein:
   a. said pulse generator includes a timing resistor and a timing capacitor in series and connected across said power source;
   b. diode means connected to a terminal of the power source and in series with a conducting path through said bistable multivibrator, to thereby produce a predetermined bias voltage drop across said diode means;
   c. a first transistor having an emitter, a base and a collector, and a capacitor connected on one side to the emitter and on the other side to a point intermediate said timing capacitor and resistor, the base of said first transistor being connected to said diode means, charging of said timing capacitor eventually causing the voltage drop across said timing resistor to fall below the diode bias voltage to thereby forward bias said first transistor; and
   d. a second transistor having an emitter, a base and a collector, the collector of the first transistor being connected to the base of the second transistor whereby said first and second transistors are forward biased together to produce the single polarity pulses on an output terminal of the second transistor.